(12) United States Patent  (10) Patent No.: US 6,382,551 B1
Nelson  (45) Date of Patent: May 7, 2002

(54) MULTIPLE-SIZE BAG DISPENSER

(75) Inventor: Ann Nelson, Newport Beach, CA (US)

(73) Assignee: Medical Action Industries Inc., Hauppauge, NY (US)

( * ) Notice: Subject to any disclaimer, the term of this patent is extended or adjusted under 35 U.S.C. 154(b) by 0 days.

(21) Appl. No.: 09/552,346

(22) Filed: Apr. 19, 2000

(51) Int. Cl.$^7$ .............................................. B65H 16/02
(52) U.S. Cl. .................... 242/594.1; 206/391; 206/395; 206/408; 206/409
(58) Field of Search ............................. 242/594, 594.1, 242/594.2, 595; 206/389, 391, 395, 408, 409

(56) References Cited

U.S. PATENT DOCUMENTS

| | | | |
|---|---|---|---|
| 1,716,628 A | | 6/1929 | Gittelman |
| 2,531,090 A | * | 11/1950 | Turner .......................... 206/395 |
| 3,007,177 A | * | 11/1961 | Jackson et al. .............. 242/595 |
| 3,050,224 A | | 8/1962 | Drolshammer |
| 3,246,742 A | * | 4/1966 | Coe ............................. 206/395 |
| 3,276,575 A | * | 10/1966 | Sanderson ................... 242/595 |
| 3,280,987 A | * | 10/1966 | Steinbock .................... 206/395 |
| 3,603,519 A | * | 9/1971 | Brown et al. ............. 242/594.1 |
| 3,684,128 A | | 8/1972 | Grisafe |
| 3,958,768 A | | 5/1976 | Fairbanks |
| 4,369,929 A | | 1/1983 | Cayer |
| 4,469,243 A | | 9/1984 | Ito et al. |
| 4,478,354 A | | 10/1984 | Notheis |
| 4,549,689 A | * | 10/1985 | Bailey .......................... 242/595 |
| 4,645,108 A | * | 2/1987 | Gavin et al. ................. 206/395 |
| 6,032,798 A | * | 3/2000 | Bryant ......................... 206/391 |

FOREIGN PATENT DOCUMENTS

GB 2113653 * 8/1983 .............. 242/594.1

* cited by examiner

Primary Examiner—Emmanuel M. Marcelo
(74) Attorney, Agent, or Firm—Schweitzer Cornman Gross & Bondell LLP

(57) ABSTRACT

A reusable container for holding and dispensing rolls of disposal bags of large, medium and small axial lengths has a top panel, a bottom panel and first and second side panels formed from a unitary piece of corrugated cardboard, or the like, into a parallelpied container having a cavity divided into individual compartments for rolls with which elongated dispensing openings communicate. Opposed inwardly-projecting end flaps hingedly connected to the bottom panel have a substantially flat abutment panel located inside the cavity of the container and located a predetermined minimum distance from an associated end of the cavity. The ends of each dispensing opening associated with large rolls are substantially aligned with the abutment panels of both inwardly-projecting end flaps. One end of each dispensing opening associated with the medium and small rolls are substantially aligned with one of the abutment panels of the inwardly-projecting end flaps. Spacing inserts are inserted into the compartments for each of the medium and small rolls. The spacing inserts contact an abutment panel of one of the inwardly-projecting end flaps and each spacing insert includes an abutment portion substantially aligned with one end of an associated dispensing opening. Each of the large rolls are held in substantial axial alignment with associated dispensing openings by the abutment panels of the inwardly-projecting end flaps. Each of the medium and small rolls are held in substantial axial alignment with associated dispensing openings by an abutment panel of one of the inwardly-projecting end flaps and by an abutment portion of one of the spacing inserts. Outer end flaps are releasably engages over the inwardly-projecting end flaps to maintain the inwardly-projecting end flaps in the inserted position.

5 Claims, 7 Drawing Sheets

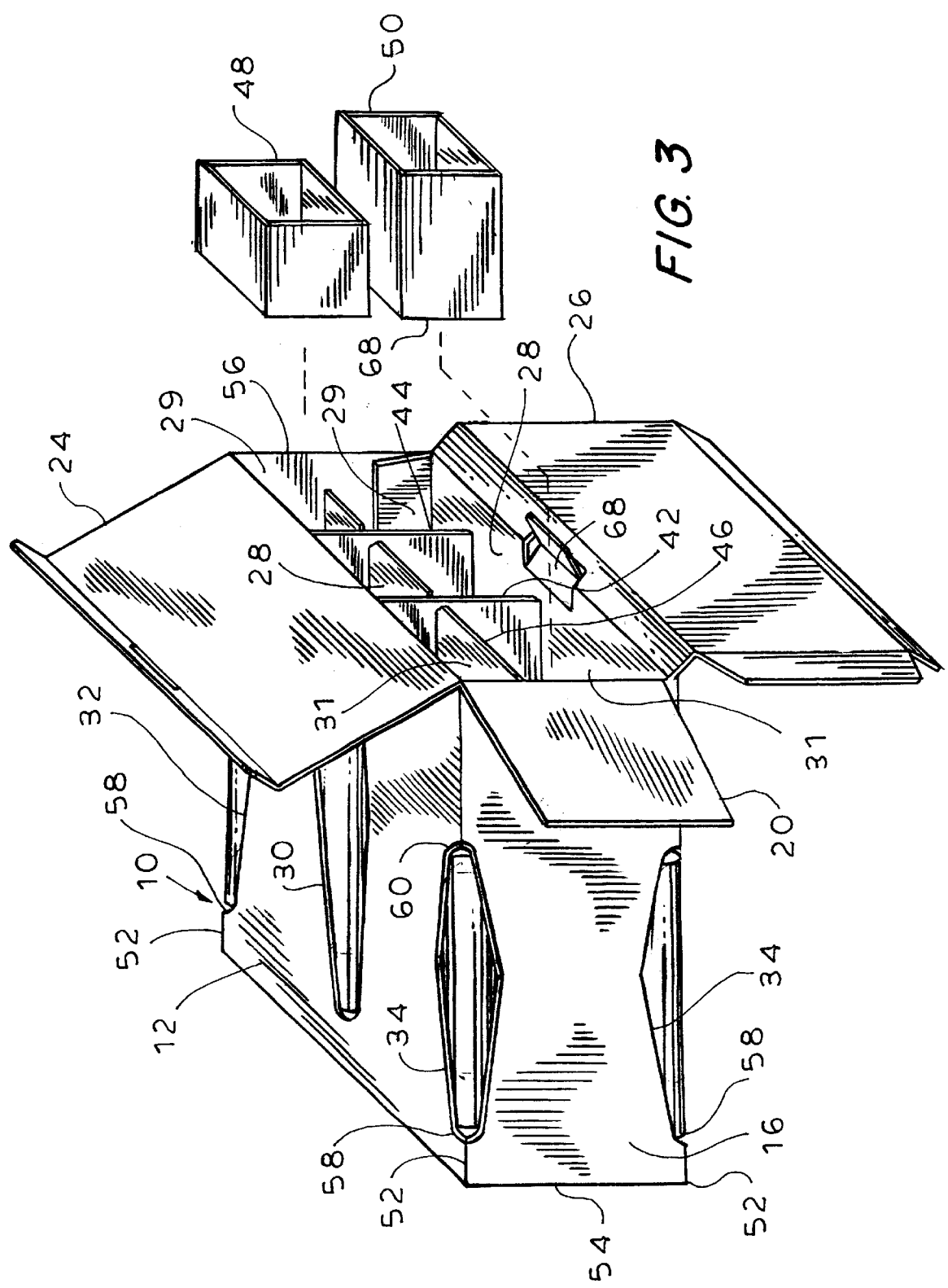

MULTIPLE-SIZE BAG DISPENSER

FIELD OF THE INVENTION

The invention pertains to bag dispensers, and in particular to disposal bag dispensers.

BACKGROUND AND SUMMARY OF THE INVENTION

Bags, especially disposable bags, are typically manufactured in continuous lengths, with the bottom of one bag separated from the top of an adjacent bag by a line of weakness, such as perforation, such that the bags can be easily separated for use. The bags are typically formed by sealing two sheets of material (such as polyethylene). The continuous lengths of bags are typically wound in rolls (e.g., MIA interleaved rolls) to aid in dispensing and to save on space, which is often at a premium. The rolls of bags are often inserted into containers, such as boxes, to provide a convenient means to transport, store and dispense the bags.

A common use of disposable bags is for containing and disposing of waste, such as medical waste, including medical devices, trash and linens, which may constitute biohazardous materials. Hospitals, medical practitioners, and the like often use such disposable bags in their practice to contain and dispose of medical waste produced in their practice. The amount of waste produce in such practice often varies widely.

For environmental and economic reasons, it is often desirable to use the smallest size bag practicable to contain and dispose of such waste. Therefore, it is desirable for medical practitioners to have a plurality of sizes of disposable waste bags on hand. The axial dimension, or axial length of a given roll of bags (i.e., the length of the longitudinal axis thereof) is dictated by the width of the bags (i.e., the distance between the sides of each bag). The diameter of the roll is dictated by a number of factors including, the number of bags on the roll, the tightness of the roll, the diameter of the core of the roll, if any (e.g., a cardboard tube), and the thickness of the material used to form the bags.

Also, it is desirable for such plurality of sizes of bags to be easily accessible to the medical practitioner. However, the space available for locating and storing such bags is often very limited. Therefore, what is desired is an inexpensive, disposable means to conveniently and economically store bags, such a medical waste disposal bags, such that a plurality of sizes of bags are easily accessible to the user.

The present invention, which satisfies the above objections, is a container, preferably in the form of a re-usable, disposable, cardboard parallelpipe, or rectangular container, which includes a plurality of compartments of various lengths for holding a number of rolls of bags of corresponding dimensions. The container includes dispensing openings, which communicate with the compartments. Each dispensing opening is sized according to the dimensions of the of the roll contained in the compartment accessed by the opening.

The interior of the container is preferably divided into six compartments by three interconnecting, slotted cardboard panels which are inserted into the container. Preferably, the rolls in the container are of substantially equal diameter, and only vary in axial. Therefore, the lateral cross section of each compartment is substantially equal.

Spacing inserts, also preferably formed from cardboard, are inserted into certain ones of the compartments which hold rolls of bags having relatively short axial lenghts to decrease the longitudinal dimension of the certain compartments. The spacing inserts serve limit the movement of the rolls within the compartments and server to align the rolls with the dispensing openings. Accordingly, the spacing inserts are sized according to the longitudinal dimension of the compartment and the axial length of the roll within the compartment.

Preferably, four "corner" dispensing openings are located on opposed (right angle) edges of the container, and two "center" dispensing openings are located along longitudinal center lines of the (flat) top and bottom of the container, respectively.

Preferably, the longitudinal dimension of the container is sized according to the size of the "largest" roll(s), that is the roll or rolls having the greatest longitudinal dimension, and the dispensing openings are all preferably generally aligned with at least one end of the container. The dispensing openings associated with the largest rolls are preferably aligned substantially equidistant to the opposed ends of the container. The dispensing openings for relatively shorter rolls are preferably generally aligned toward one end of the container. Preferably, all of the dispensing opening for the shorter rolls are generally aligned toward the same end of the container.

To maintain the structural integrity of the container, the ends of each dispensing opening are spaced a distance inwardly from the ends of the container. Specifically, the ends of the dispensing openings associated with largest-sized rolls are spaced a predetermined distance away from each end of the container. The ends of the dispensing openings associated with the relatively shorter rolls are preferably spaced the same predetermined distance from the end of the container with which the dispensing opening is aligned. It can be appreciated that, since the relatively shorter dispensing openings can be of various sizes, the distance from the relatively shorter dispensing openings to the end of the container opposed from the end with which these dispensing openings are respectively generally aligned will vary depending on their length. As stated above, preferably each relatively shorter dispensing opening is generally aligned with the same end of the container.

One of the two end flap panels on each end of the container projects a predetermined distance inwardly into the cavity of the container. The inwardly-projecting end flap panels include abutment panels which the slotted inserts and the spacing inserts contact. Preferably, the inward-projecting end flap panels also provide abutment surfaces for both ends of the largest sized rolls, and for one end of the relatively shorter rolls. It can be appreciated that the associated spacing insert provides a similar abutment surface for the end of the (relatively shorter) roll adjacent thereto. The abutment panels of the inwardly-projecting end flaps are located inside the cavity of the container and are located at predetermined distance from the adjacent end of the cavity so as to substantially align the adjacent ends of the rolls with one end of the dispensing openings. The spacing inserts project inwardly from the opposite inwardly projecting end flap sufficient to substantially align the ends of the (relatively shorter) rolls adjacent thereto with the opposite end of the dispensing opening.

The exterior of the container is preferably formed from a unitary, two-dimensional piece of corrugated cardboard, which is dye-cut to form the a flat blank. Fold lines are scored into the flat blank forming a top panel, a bottom panel, two sides panels, four side flap panels, four end flap panels, and edge flap portions, which edge flap portions extend from the end flap panels. In addition, the exterior is punched to form the dispensing openings and to form integral closure latches and associated closure slots for each end of the container.

The slotted panels are formed in a similar manner, by dye-cutting and/or dye-cutting a flat blank of cardboard to form the periphery of the slotted panels, as well as the slots therein. The spacing inserts are preferably formed from a unitary, cardboard flat blank which is die-cut to form individual right-angle, X-shaped blanks, which are then scored to form fold lines separating an end portion and top, bottom and two side portions each connected to the end portion.

Rolls of bags can be replaced, once expended, by opening one of the ends of the container (preferably the end without the spacing inserts), removing the spent roll, inserting a new roll, and re-closing the container. Thus, the container can be re-filled and re-used at will.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 3 is a perspective view of the container of FIG. 1, showing the insertion of spacing inserts into the compartments of the container.

DETAILED DESCRIPTION OF THE INVENTION

Figure 1:
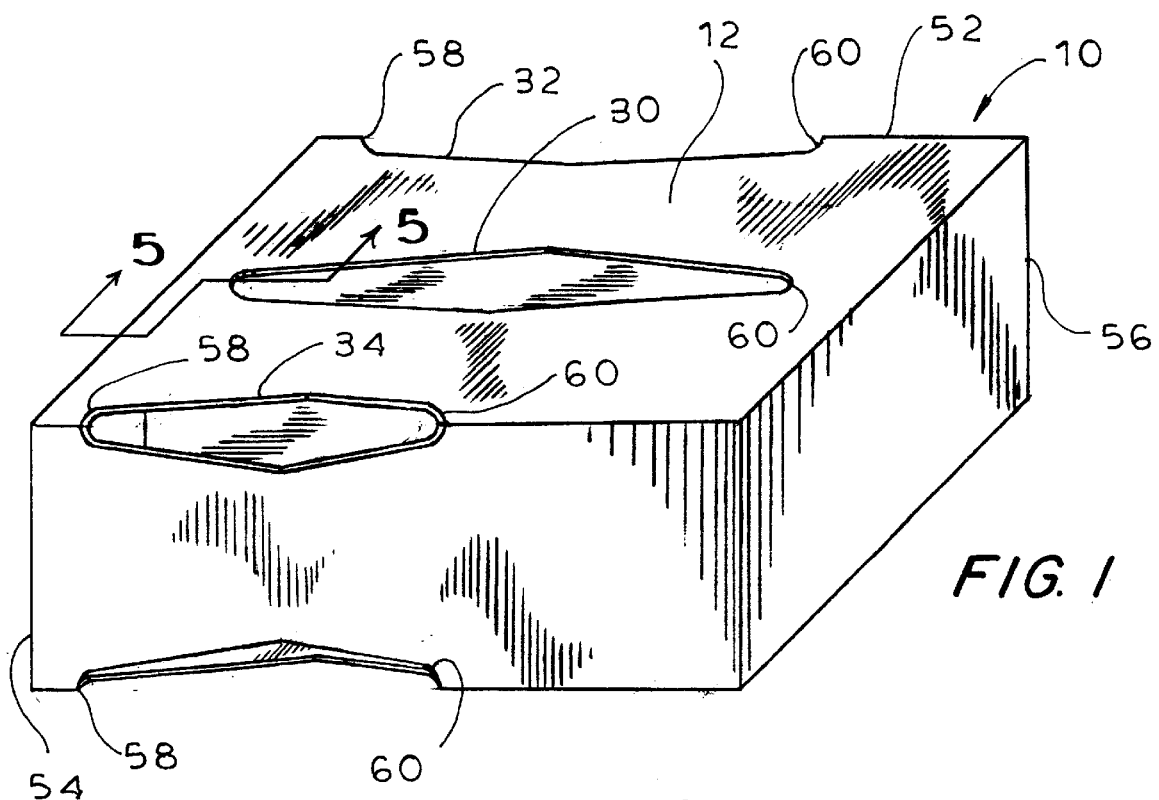
FIG. 1 is a perspective view of the container of the present invention, from the top, showing the container in a closed position.

Referring to FIGS. 1–4, the present invention is a re-usable, disposable container 10, preferably formed of corrugated cardboard, and preferably in the form of a parallelpiped, or rectangular shape having top, bottom and side panels 12, 14, 16, 18, and having side flap panels 20, 22, and end flap panels 24, 26. The container includes a plurality of compartments 28, 29, 31 of various lengths for holding a number of rolls of bags 36, 38, 40 of corresponding dimensions. The container includes a plurality of elongated dispensing openings 30, 32, 34, which communicate with the compartments 28, 29, 31, respectively. Each dispensing opening 30, 32, 34 is sized according to the dimensions of the of the roll contained in the compartment accessed by the opening.

The interior of the container is preferably divided into six compartments 28, 29, 31 by three interlocking, slotted cardboard panels 42, 44, 46 which are inserted into the container 10. Preferably, the rolls 36, 38, 40 in the container are of substantially equal diameter, and only vary in axial length. Therefore, the lateral cross-section of each compartment 28, 29, 31 is preferably substantially equal.

Spacing inserts 48, 50, also preferably formed from corrugated cardboard, are inserted into certain ones of the compartments 29, 31 which hold rolls 38, 40 of bags having relatively shorter axial lengths to decrease the longitudinal dimension of the certain compartments. The spacing inserts 48, 50 serve to limit the movement of the rolls within the compartments 29, 31 and server to align the rolls with the associated dispensing openings 32, 34. Accordingly, the spacing inserts 48, 50 are sized according to the longitudinal dimension of the compartment 29, 31 and the axial length of the roll 38, 40 within the compartment.

Preferably, the container 10 is configured to hold six rolls—two rolls of three different sizes. Thus, the container includes six individual compartment and six dispensing openings. The six compartments can be formed from the three interlocking panels 42, 44, 46. Preferably, four "corner" dispensing openings 32, 34 are located on opposed (right angle) edges 52 of the container 10, and two "center" dispensing openings 30 are located along imaginary longitudinal center lines of the (flat) top and bottom 12, 14 of the container 10, respectively.

The container preferably holds a first set of two "large", e.g., 44 gallon, bags, a second set of two "medium", e.g., 30 gallon, bags and a third set of two "small", e.g., 10 gallon, bags. The rolls can typically hold 50 small bags and 25 medium/large bags. The container can include indicia (not shown) adjacent the dispensing openings 30, 32, 34 associated with the large, medium and small bags, to indicate the intended use and/or capacity.

Preferably, the longitudinal dimension of the container 10 is sized according to the size of the large roll(s) 36, that is the roll or rolls having the greatest longitudinal dimension, and the dispensing openings 30, 32, 34 are all preferably generally aligned with at least one end 54 of the container 10. The dispensing openings 30 associated with the largest rolls 36 are preferably aligned substantially equidistant to the opposed ends 54, 56 of the container. The dispensing openings 32, 34 for relatively shorter rolls are preferably generally aligned toward one end 54 of the container 10. Preferably, all of the dispensing openings 32, 34 for the shorter rolls are generally aligned toward the same end of the container.

To maintain the structural integrity of the container, the ends 58, 60 of each dispensing opening 30, 32, 34 are spaced a predetermined distance inwardly from the ends 54 of the container. Specifically, the ends 58, 60 of the dispensing openings 30 associated with largest-sized rolls 36 are spaced the predetermined distance away from each end 54, 56 of the container 10. The ends 58, 60 of the dispensing openings 32, 34 associated with the relatively shorter rolls 38, 40 are preferably spaced the same predetermined distance from the end 58 of the container 10 with which the dispensing opening 32, 34 is aligned. It can be appreciated that, since the relatively shorter dispensing openings 32, 34 can be of various sizes, the distance from the relatively shorter dispensing openings to the end 60 of the container 10 opposed from the end 58 with which these dispensing openings are respectively generally aligned will vary depending on their length. As stated above, preferably each relatively shorter dispensing opening 32, 34 is generally aligned with the same end of the container 10.

Figure 4:
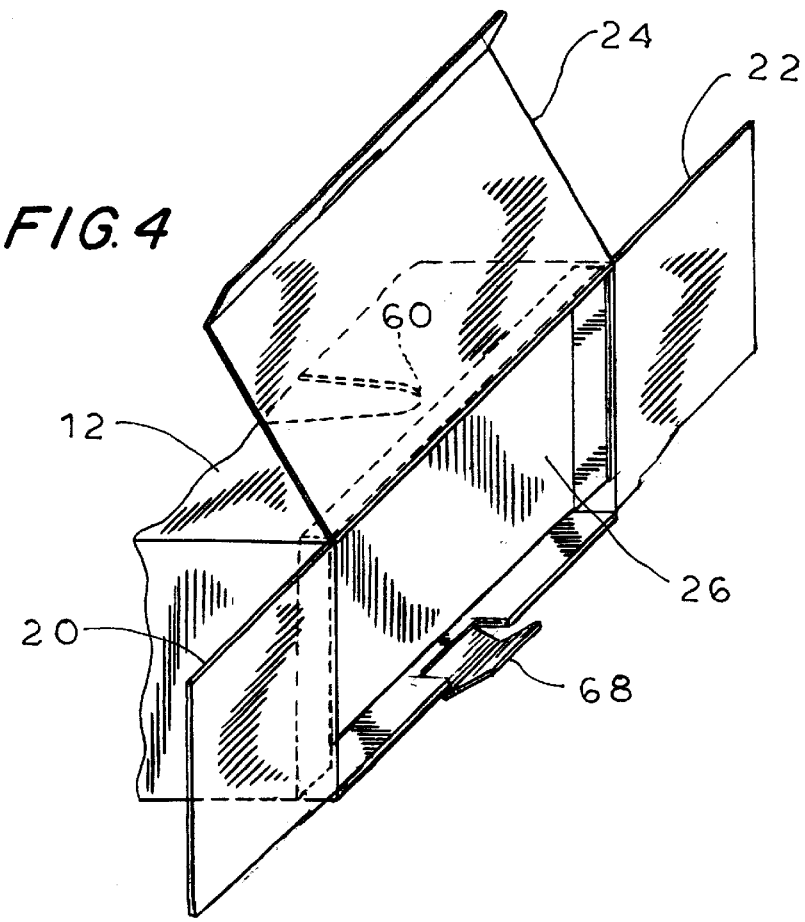
FIG. 4 is a perspective view of the container of FIG. 1, showing the inwardly-projecting end flap panel of one end of the container in the closed position.
Figure 2:
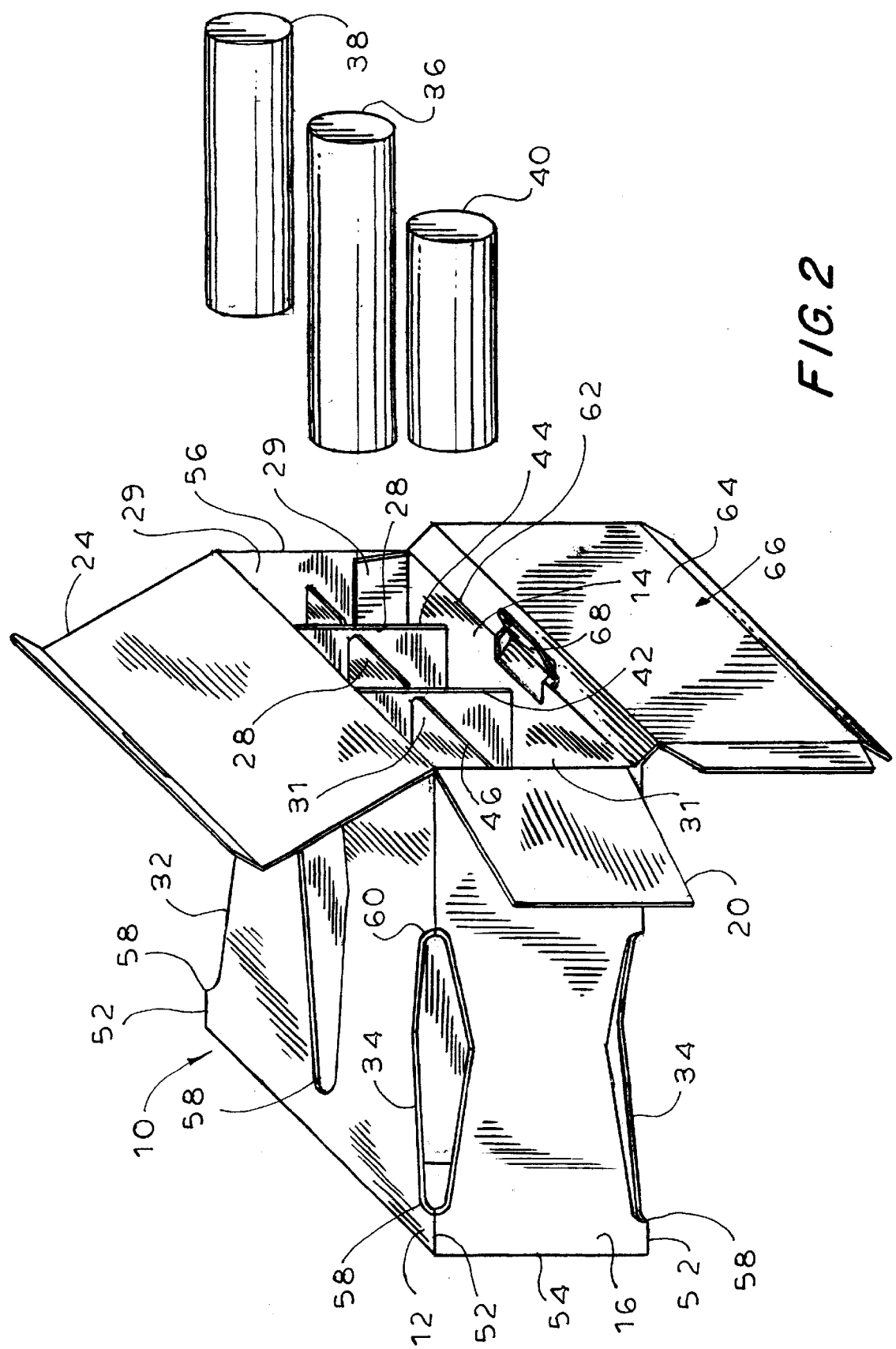
FIG. 2 is a perspective view of the container of FIG. 1, showing the insertion of rolls into the compartments of the container

Referring to FIGS. 1–5, inwardly-projecting end flap panels 26 are hingedly connected to opposed ends 62 of the bottom panel 14 of the container are pivotal between removed positions (FIG. 3) and inserted positions (FIG. 4). The inwardly-projecting end flap panels 26 each include an abutment panel 64 forming a substantially flat abutment surface 66 which the slotted inserts 42, 44, 46 and the spacing inserts 48, 50 contact. The inward-projecting end flap panels 26 also provide abutment surfaces for both ends of the largest sized rolls 36, and for one end of the relatively shorter rolls 38, 40. The associated spacing inserts 48, 50 each have an abutment portion 68 which provides similar abutment surface for the end of the (relatively shorter) rolls 38, 40 adjacent thereto. Each abutment panel of the inwardly projecting end flap panels preferably has a peripheral shape which substantially corresponds to a cross-sectional shape of the cavity of the container.

The abutment panels 64 of the inwardly-projecting end flaps 26 are located inside the cavity of the container 10 and are located at predetermined distance from the adjacent end 54, 56 of the cavity so as to substantially align the adjacent ends of the rolls with one end 58 of the dispensing openings. The spacing inserts 48, 50 project inwardly from the opposite inwardly-projecting end flap 64 sufficient to substantially align the ends of the (relatively shorter) rolls 38, 40 adjacent thereto with the opposite end 60 of the dispensing opening 32, 34.

Outer end flap panels 24, hingedly connected to the top panel 12 of the container 10 fold over the inwardly-projecting end flap panels 26. The outer end flap panels 24 have a closed position (FIG. 1) in which the outer end flap panels 24 urge and maintain the inwardly-projecting end flap panels 26 in the inserted position, and an open position (FIGS. 2–4) in which the inwardly-projecting end flap panels 26 are free to pivot into the removed position. The container includes releasable latch structure 68, preferably integrally formed with the container 10, to maintain the outer end flap panels 24 in a closed position.

Figure 6:
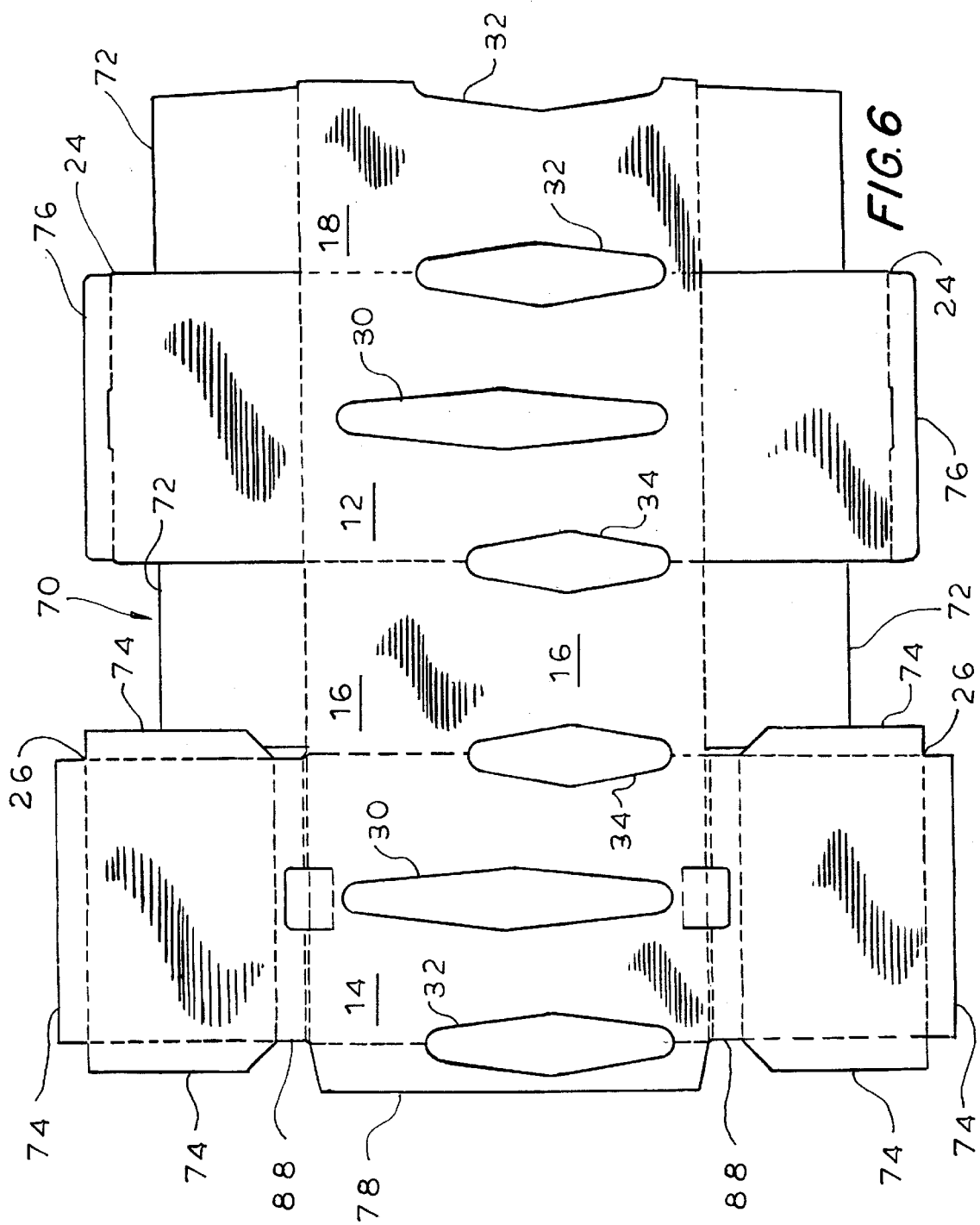
FIG. 6 is a top plan view of the flat blank of the exterior of the container.

Referring to FIG. 6, the exterior of the container 10 is preferably formed from a unitary, two-dimensional piece of disposable corrugated cardboard 70, which is dye-cut to form the a "flat blank". Cut lines (shown in solid lines) and hinge-forming fold lines (shown in dotted lines) are scored into the flat blank forming a top panel 12, a bottom panel 14, two sides panels 18, 20, four side flap panels 72, four end flap panels 24, 26, and edge flap portions 74, 76, which edge flap portions extend from the end flap panels. In addition, the exterior is punched to form the dispensing openings 30, 32, 34 and to form integral closure latches and associated closure slots for each end of the container. The blank also includes a fastening portion 78 connected to the bottom panel 14.

Figure 7:
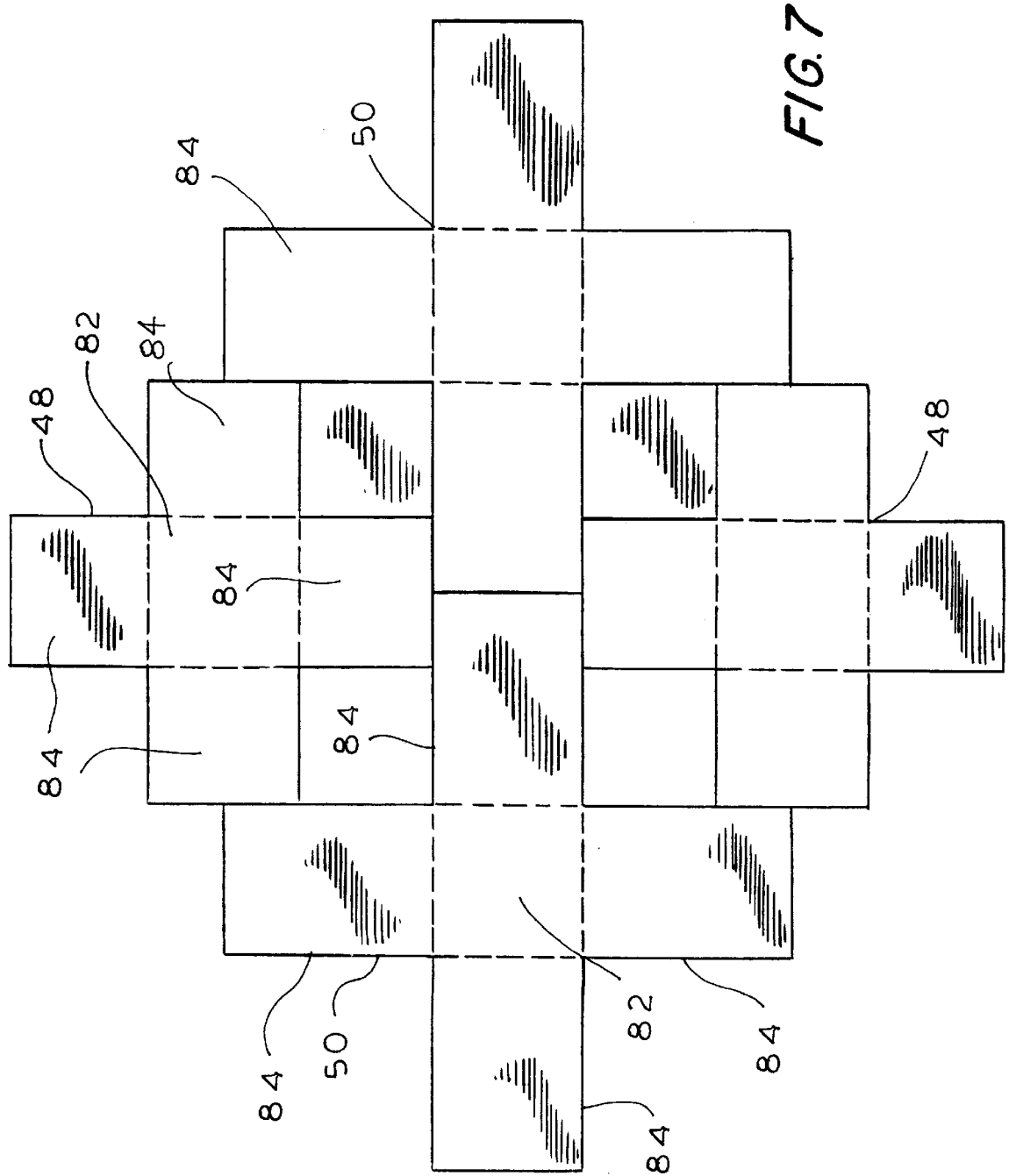
FIG. 7 is a top plan view of the flat blank of the spacing inserts.
Figure 8:
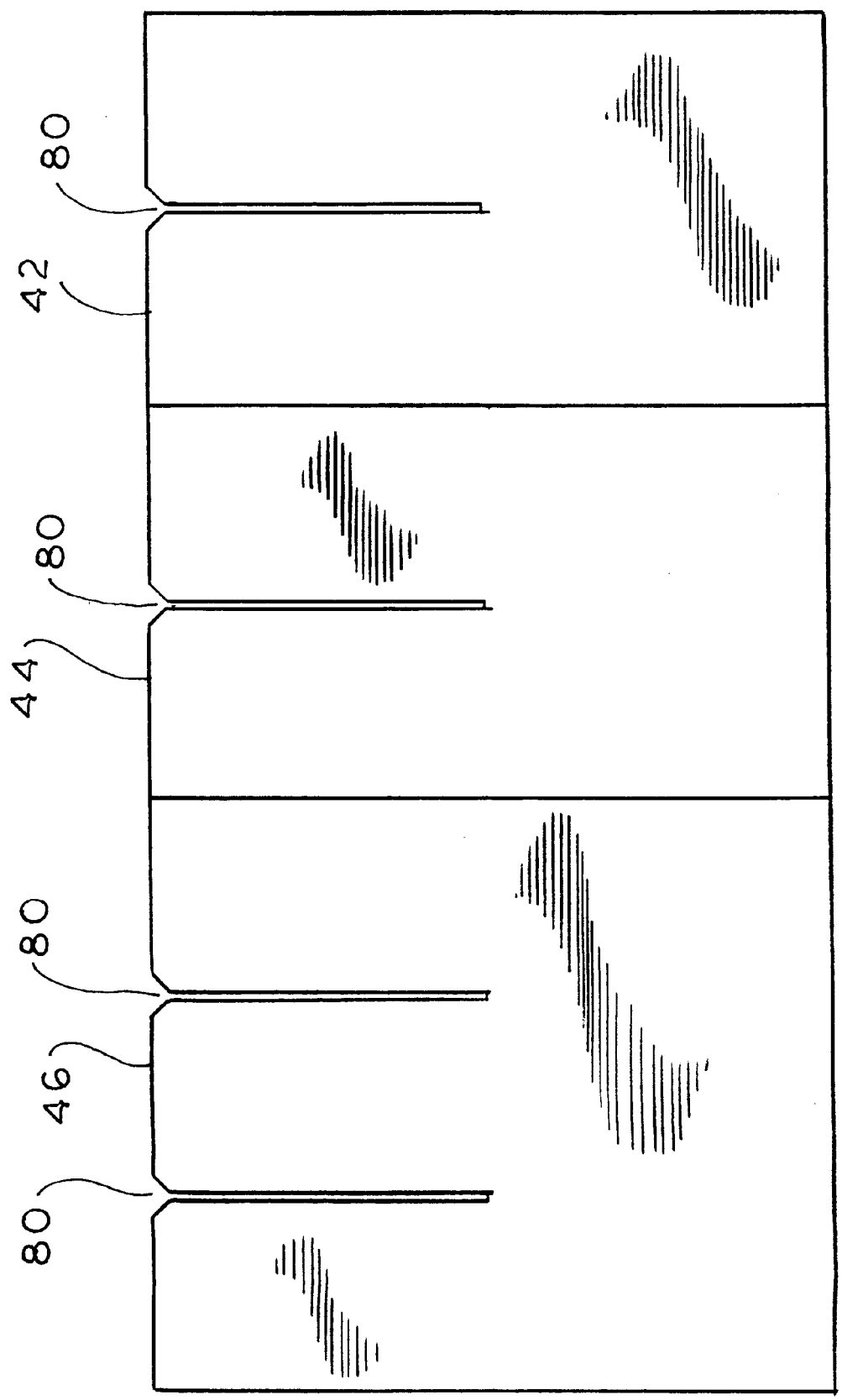
FIG. 8 is a top plan view of the flat blank of the slotted panels.

Referring to FIGS. 7–8, the slotted panels 42, 44, 46 are formed in a similar manner, by dye-cutting and/or dye-cutting a flat blank of cardboard to form the periphery of the slotted panels, as well as the slots 80 therein. The spacing inserts 48, 50 are preferably formed from a unitary, cardboard flat blank which is die-cut to form individual right-angle, X-shaped blanks, which are then scored (dotted lines) to form fold lines separating an end portion 82 and wing portions 84 each connected to the end portion 82.

To form the three-dimensional container, the flat blank for the container is folded along the fold lines between the top, bottom and side panels 12, 14, 16, 18, and is then preferably secured with the fastening portion 78 to form an open-ended container 10 with an internal cavity. One end of the container 10 is closed by folding the associated inwardly-projecting end flap panel 26 inwardly, folding the opposing end flap panels 20, 22 inwardly over the inwardly-projecting end flap panel 26, and then folding an outer end flap panel 24 over the end flap panels and engaging the associated integrally-formed closure latch 68. Next, the slotted inserts 42, 44, 46 are mated and inserted into the cavity of the container 10 through the open end to form the compartments 28, 29, 31 for the rolls. (FIG. 3). The rolls of bags 36, 38, 40 are then inserted into the compartments, as shown. In the next step, the spacing inserts 48, 50 are folded into the proper shape and are inserted into the appropriate compartments 29, 31. The open end of the container is then closed in a manner similar to that of the other end.

Figure 5:
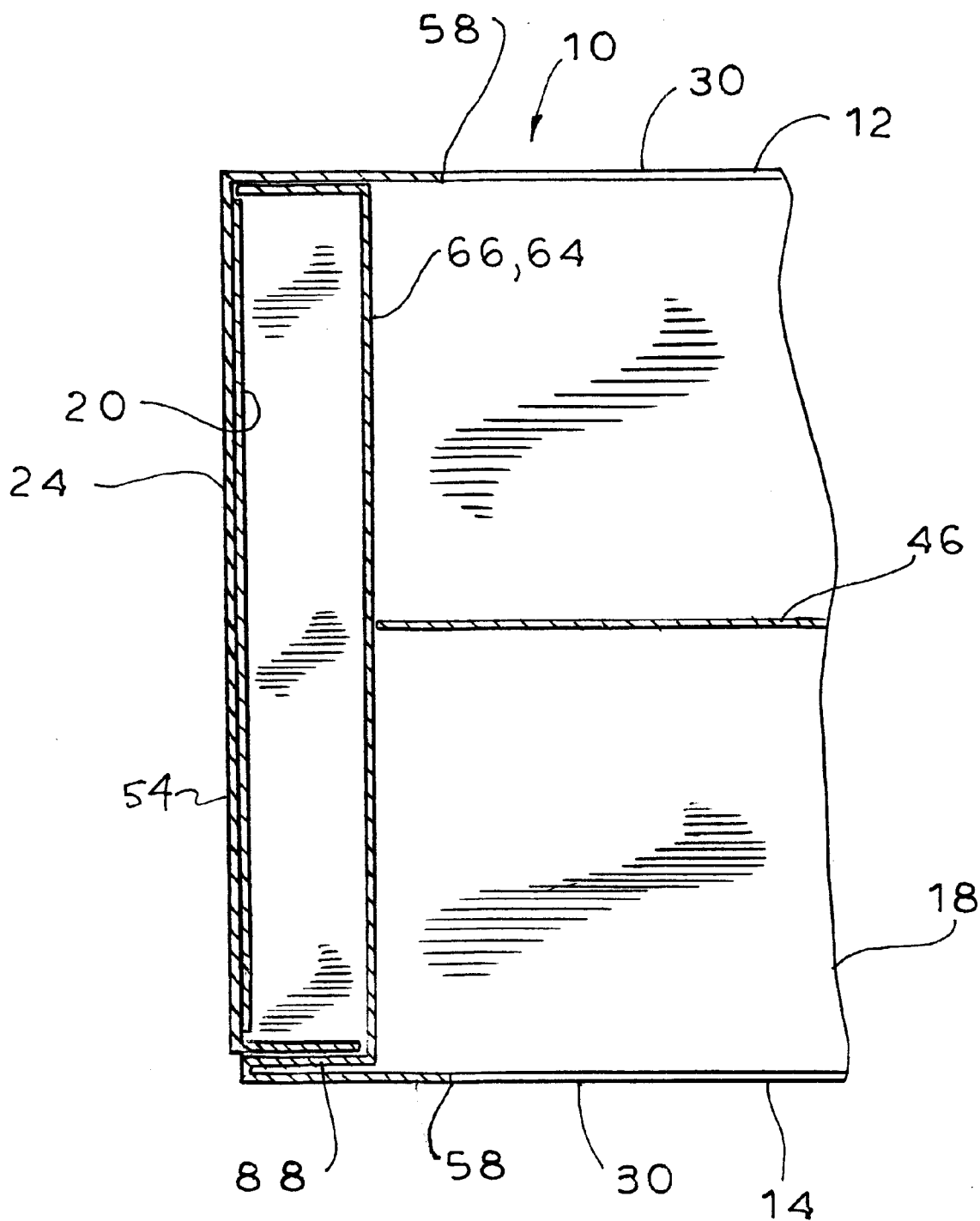
FIG. 5 is a cross-sectional view of the container, taken along line 5—5 of FIG. 1.

Referring to FIGS. 5 and 6, the abutment panels 64 of each inwardly projecting end flap panel 26 is maintained at the predetermined distance from the associated end 54 of the container 10 by an integral hinge portion portion 88, intermediate the bottom panel 14 and the abutment panel 64, and by one or more of the edge flap portions 74 connected to the abutment panel 64. As best seen in FIG. 6 an upper edge flap portion 74 contacts the outer end flap 24.

Rolls of bags can be replaced, once expended, by opening one of the ends of the container (preferably the end without the spacing inserts), removing the spent roll, inserting a new roll, and re-closing the container. Thus, the container can be re-filled and re-used at will.

The present invention provides an improve container for housing rolls of disposal bags suitable for a multitude of uses including medical practitioners, veterinarians, clinical laboratories, and the like. The container eliminates the need to stock multiple cases, provides convenient access to disposal bags of various sizes, enables a facility to purchase small quantities of product, and provides a convenient, reusable and refillable dispensing system which organizes disposal bags in small quantities appropriate to usage levels in offices and clinics. Also, it is intended that refills for the container can be offered separately.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A reusable container for holding and dispensing rolls of disposal bags of various axial lengths, the container comprising:

a top panel, a bottom panel and first and second side panels, said container having first and second end portions, and each of said top, bottom and side panels having first and second end portions, and said top, bottom and side panels being interconnected and forming a parellelpiped container defining a cavity;

means to divide the cavity into separate compartments for holding individual rolls of bags;

a plurality of dispensing openings, each in communication with one of said compartments;

first and second sets of rolls of disposal bags, said first set of rolls having an axial length substantially greater than that of said second set of rolls;

first and second inwardly-projecting end flaps, each pivotally connected to one of said first and second ends of said bottom panel, respectively;

said first and second inwardly-projecting end flaps each having an inserted position wherein said inwardly-projecting end flap is inserted into the cavity, and having a removed position wherein said inwardly-projecting end flap is outside the cavity, each inwardly-projecting end flap being pivotal between said removed and said inserted position;

each inwardly-projecting end flap including a substantially flat abutment panel substantially an entirety of said abutment panel being located inside said cavity and being located a predetermined distance from an associated end of the cavity when an associated inwardly-projecting end flap is in said inserted position;

said dispensing openings being elongated in shape, and having first and second ends, said first and second ends of each dispensing opening associated with said rolls of said first set being substantially aligned with said abutment panels of said first and second inwardly-projecting end flaps, respectively, one end of each dispensing opening associated with one of said rolls of said second set being substantially aligned with one of said abutment panels of said first and second inwardly-projecting end flaps;

spacing inserts inserted into said compartments for each roll of said second set, each spacing insert contacting an abutment panel of one of said inwardly-projecting end flaps and each spacing insert including an abutment portion being substantially aligned with one end of an associated dispensing opening; and each roll of said first set contacting and being held in substantial axial alignment with associated dispensing openings by said abutment panels of said first and second inwardly-projecting end flaps, and each roll of said second set contacting and being held in substantial axial alignment with associated dispensing openings by an abutment panel of one of said first and second inwardly-projecting end flaps and by an abutment portion of one of said spacing inserts; and means to releasably maintain said inwardly-projecting end flaps in said inserted position.

2. A reusable container as in claim 1, wherein said means to releasably maintain said inwardly-projecting end flaps in said inserted position comprises first and second outer end flaps pivotally connected to said first and second ends of said top panel, respectively;

each outer end flap having a closed position in which said outer end flap urges an associated inwardly-projecting end flap into said inserted position, and having an open position in which an associated inwardly-projecting end flap is free to move into said removed position, each outer end flap being pivotal between said open and closed position;

each inwardly-projecting end flap includes a hinge portion hingedly connected intermediate said abutment panel and said bottom panel;

each inwardly-projecting end flap also includes an outwardly-extending edge flap portion hingedly connected to said abutment panel of said inwardly-projecting end flap;

said outwardly-extending edge flap portion having an edge in contact with one of said outer end flaps, said hinge portion and said outwardly-extending edge flap portion maintaining said abutment panel at said predetermined minimum distance from an associated end of said container;

means to releasably maintain each outer end flap in said closed position.

3. A container as in claim 2, wherein said top panel, said bottom panel, said side panels, said inwardly-projecting end flaps, and said outer end flaps being integrally formed from a unitary piece of disposable material;

said means to divide said cavity comprises interlocking, slotted panels, each formed from disposable material;

each spacing insert is formed from a unitary piece of disposable material.

4. A container as in claim 3, wherein said container further comprises a third set of rolls having each having an axial length less than said second set of rolls; and said container having two rolls from each of said first, second and third sets;

one roll of each of said first, second and third sets being accessible from said top and bottom of said container, respectively.

5. A container as in claim 4, wherein:

said container comprises six compartments, six rolls and six dispensing openings, four of said dispensing opening being substantially aligned with and located along fold lines between said top, bottom and side panels; and one each of said dispensing openings being substantially aligned with and located along longitudinal center lines of said top and bottom panels, respectively.

* * * * *

UNITED STATES PATENT AND TRADEMARK OFFICE
CERTIFICATE OF CORRECTION

PATENT NO.      : 6,382,551 B1
DATED           : May 7, 2002
INVENTOR(S)     : Ann Nelson It is certified that error appears in the above-identified patent and that said Letters Patent is hereby corrected as shown below:

<u>Column 8,</u>
Line 48, add new claim 6, as follows:
-- 6.    A reusable container for holding and dispensing rolls of disposal bags of various axial lengths, the container comprising:
    a top panel, a bottom panel and first and second side panels, said container having first and second end portions, and each of said top, bottom and side panels having first and second end portions, and said top, bottom and side panels being interconnected and forming a parellelpiped container defining a cavity;
    means to divide the cavity into separate compartments for holding individual rolls of bags;
    a plurality of dispensing openings, each in communication with one of said compartments;
    first and second sets of rolls of disposal bags, said first set of rolls having an axial length substantially greater than that of said second set of rolls;
    first and second end flaps, each end flap including a substantially flat abutment panel;
    spacing inserts inserted into said compartments for each roll of said second set, each spacing insert having an abutment portion for contacting one of said rolls and each spacing insert contacting an abutment panel of one of said end flaps; and
    each roll of said first set contacting and being held in substantial axial alignment with an associated dispensing opening by said abutment panels of said first and second end flaps, and
each roll of said second set contacting and being held in substantial axial alignment with an associated dispensing opening by said abutment panels of said first and second end flaps, and each roll of said second set contacting and being held in substantial axial alignment with an associated dispensing opening by an abutment panel of one of said first and second end flaps and by an abutment portion of one of said spacing inserts. --

Signed and Sealed this

First Day of October, 2002

*Attest:*

*Attesting Officer*

JAMES E. ROGAN
*Director of the United States Patent and Trademark Office*